2,954,297
Patented Sept. 27, 1960

2,954,297

CULINARY MIX

Charles C. Elsesser, Katonah, and Stephen W. Bogyo, Tarrytown, N.Y., assignors to General Foods Corporation, White Plains, N.Y., a corporation of Delaware No Drawing. Filed June 17, 1959, Ser. No. 820,874

10 Claims. (Cl. 99—94)

This invention relates to a powdered free flowing fat composition and to a process for preparing the same. This application is a continuation-in-part of U.S. application Serial Number 600,384 filed June 23, 1955, for Food Product and Process.

Powdered fat compositions consisting generally of small particles of fat encased in a coating of edible, water soluble solids, and their use in various food products such as cakes, pastries, bread, toppings, and the like, are well known. It has been proposed, for example, to dry emulsions of shortening, fat and non-fat milk solids either by spray-drying, drum-drying, and the like to provide a powdered free flowing shortening composition. Such proteinaceous materials as buttermilk solids, whey solids, whole eggs, egg yolks, gelatin, sodium caseinate, and neutral water soluble soy protein have been proposed as encapsulating solids; the use of other materials, either separately or in combination with some of the aforementioned proteinaceous materials has included gums such as cellulose ether, gum tragacanth, gum acacia and carbohydrates such as starches and sugars which have also been proposed. Furthermore, improved powdered fat products have been prepared employing "emulsifiers" such as lecithin, partial esters of glycerine and the higher fatty acids as well as partial esters of sorbitol and the higher fatty acids.

These powdered fat compositions offer the advantages of ease of handling and of incorporation with other dry free flowing ingredients during the preparation of various food products. They have enjoyed a fair amount of commercial success. Thus, they have been used as part of the shortening in doughnut, cake, and biscuit mixes where it is desired to have a free flowing product. However, in all of these applications there is usually also employed a plastic shortening due to the inability of the powdered fat to act by itself to supply the fat needed.

For example, a large potential use of powdered fat compositions is in prepared cake mixes. The present method of incorporating shortenings into these mixes roughly parallels that of the housewife and involves the step of creaming the shortening with one or more of the dry ingredients such as sugar or flour. This creaming step is necessary to insure an adequate distribution of the shortening throughout a cake batter prepared from such a mix. It is obvious that the use of powdered shortenings alone would provide a great advantage to a cake mix manufacturer and other manufacturers of baked goods by eliminating the cost and time consuming creaming operation. A powdered shortening would also be preferred over conventional modes of incorporating plastic, or the like, shortenings in dry mixes for bakery products because it affords the opportunity to emulsify the fat phase in a matrix of water soluble materials with the possibility of lessening the effort required for proper dispersion of the fat in the batter and controlling the manner in which the fat becomes available for effective cooperation with the farinaceous ingredients, the sugar, and the leavening agent in a mix as it is hydrated to a batter.

However, the presently available powdered shortenings, even when they contain so-called super glycerinated fat, produced cakes extremely poor in volume and rubbery in texture; the reason generally advanced for this poor quality is the manner in which the fat phase of the powdered shortening is released. Either the fat is released too slowly and hence is not effectively utilized or else the fat is released from its matrix in such a way as not to be properly dispersed throughout the batter during its preparation. For this reason attempts have been made to modify the manner in which the shortening fat is released from the powdered fat compositions on contact with aqueous liquids by the use of hydrophilic colloids. However, none of these attempts have been adequate due to the inability of the fat phase released to form the proper emulsion in the batter.

It is, therefore, an object of the present invention to provide a powdered fat composition wherein the fat phase and encapsulating solids perform more effectively upon reconstitution with aqueous liquids in preparing food products generally.

Another specific object of this invention is to provide a powdered fat composition which on incorporation as a shortening in prepared cake mixes provides baked goods of uniformly high quality and ease of preparation.

These and other objects of the present invention will be more fully developed hereinafter.

It has now been found that a powdered shortening composition capable of effectively releasing its fat content upon contact with aqueous liquids is provided by including in said composition a partial ester of a glycol and higher fatty acid. In this manner, a powdered fat composition is provided which is suitable for a wide range of uses including cakes, pastries, breads, biscuits, and the like. On incorporation of these compositions in the dry mixes, a mix which may be reconstituted in a very short time with a minimum of effort is obtained and which, at the same time, provides a final food product of exceptionally high quality.

It has further been found that the addition of various lecithins, and modifications and derivatives thereof, to the above fat composition provides for greater improvement in the rate of fat release on reconstitution and in improved quality in the final baked goods. The term lecithin, as used herein and in the appended claims, is intended to mean phosphatide compositions derived from materials such as soy beans, corn, cottonseed, peanuts, egg yolks, liver, and the like, containing lecithin in varying degrees of purity. Also, phosphatides modified by various processes, such as hydroxylation, phosphorylation, and the like, may be employed. Hydroxylated soy lecithin is preferred.

It is desirable for the purposes of the present invention that the lecithin be highly water dispersible but at the same time have a sufficient emulsification power for the fat phase of the system. By means of hydroxylation, that is the saturation of higher fatty acid groups in the phosphatides such that their degree of unsaturation is reduced, the fat phase is more desirably emulsified into discrete fat globules while being dispersible in the aqueous phase of this system. Hydroxylation is carried out using the agents or combinations thereof described in U.S. 2,445,948 to Whitcoff, of July 27, 1948. Actually, it has been found that when employing a hydroxylated lecithin which has an intermediate degree of saturation that there is a more desired balance in the properties of water dispersibility and emulsification so that the phosphatide is more preferably only partially hydroxylated. Thus, in the case of a soy lecithin originally composed of about 65 percent phosphatide and 35 percent soy bean oil, the hydroxylated lecithin should have an iodine number in the order of 80. Such a partially saturated lecithin derivative has the additional advantage, of course, of being more stable on storage.

The benefits of this invention are particularly apparent in powdered fat compositions containing, in addition to the aforementioned partial ester and lecithin, a selectively hydrogenated fat, a protein or protein derivative such as non-fat milk solids, sodium caseinate or whey solids, and a sugar. In the preparation of these materials, the process which is generally employed requires that an emulsion be made of the fat in an aqueous solution of the milk solids and sugar. This emulsion is then dried by any suitable means such as spray-drying, drum-drying, and the like; where the material is drum-dried, the final flaked product is comminuted to provide a powdered free flowing shortening. In the case of spray-drying, however, the final product is in a form which is particulate and free flowing. As viewed under a high powered microscope the particles of this latter case are hollow spheres consisting of a matrix of the non-fat milk solids and sugar in which a fine distribution of the fat globules is embedded.

The desired partial ester of a glycol and a higher fatty acid may be obtained by reacting any di-hydric alcohol and higher fatty acids, or fats containing fatty acids. The partial esters can be prepared by a number of techniques involving the use of heat and a suitable catalyst. The most common approaches involve either (1) the methylation of fats and the subsequent reaction of the methyl esters with the glycol or (2) the direct esterification of glycol and fatty acids. In the process of esterifying the partial ester the degree of esterification may be complete for some esters formed such that in addition to mono-esters each containing one hydroxyl group and one fatty acid group there may also be produced di-esters having both hydroxyls substituted for by fatty acids. It has been found that the di-esters, by themselves, do not provide any improved result in the present dried emulsion. The mono-esters, on the other hand, are essential; but for the most preferred results a mixture of mono- and di-esters is required. In the esterification of stearic acid and propylene glycol, for example, it has been found preferable to have a mono-ester content greater than 40 percent and less than 80 percent. Generally, it is required that the ratio of mono-esters to di-esters be sufficiently high so as to insure a substantial presence of the former. Both saturated and unsaturated fatty acids are operable, although the fatty acids preferred are those which are substantially saturated so as to evidence a maximum iodine number of about 7.5 for example, as found in some commercial preparations. Such acids in reacting with a glycol will result in a semi-solid substance at room temperature (viz. 25° C.). Partial glycol esters useful in the present invention may be prepared from fatty acids having chain lengths ranging from 12 to 22 carbon atoms, e.g., partial glycol esters of lauric, myristic, palmitic, stearic, behenic, and arachidic acids. Specific partial esters found operable in the present invention are propylene glycol mono-stearate, propylene glycol mono-palmitate, propylene glycol mono-laurate, and propylene glycol mono-myristate, although some di-esters of this series are also usually present with the partial esters. The higher fatty acids in the aforesaid group are preferred due to their stability where elevated temperatures are employed in drying therefrom. Lower fatty acids generally are not stable either in storage or as a result of the drying operation and consequently fail to provide the desired emulsifying effect. Other glycols can be employed as the glycol portion of the ester. These include the polyoxyethylene glycols, the butylene glycols, di-propylene glycols, di-ethylene glycols, and the like, and include the polymers of the various simple glycols. While all the glycols mentioned here will function according to the invention in bringing about the desired release of fat from the dried emulsion on contact with aqueous liquid, propylene glycol is preferred due to its greater suitability for use in food products. The more preferred emulsifying agents employed according to this invention are either a mixture of propylene glycol mono- and di-stearate, a mixture of propylene glycol mono- and di-palmitate, or a blend of these mixtures.

The most preferred emulsifying agent is a mixed partial ester prepared by reacting propylene glycol with commercial "triple pressed" stearic acid which contains approximately 45 percent stearic acid and 55 percent palmitic acid. The mono-ester content should be between 40 percent and 80 percent, the level of this partial ester used being of the order of 10–15 percent by weight of the composition and 20–45 percent by weight of fatty constituents. The level of the glycol fatty acid ester employed in the compositions of this invention will, of course, vary with the nature and type of ester employed and the intended end use of the compositions.

Although relatively low levels of glycol fatty acid esters in the dry fat composition of the present invention provide improved results when such compositions are employed in a cake mix, and the like, it is preferred that the levels of glycol esters contained in the fat composition be of the order of 10–15 percent of such composition. Also, the glycol esters may be employed in the fat composition with other emulsifiers such as the mono- and di-glycerides to provide the desired improvement in cake mixes, and the like.

The encapsulating solids which may be employed according to this invention include all of those materials well known in the art. The various hydrophilic colloids, such as non-fat milk solids, whey solids, sodium caseinate, soy protein derivatives, egg albumin, gelatin, partially hydrolyzed fish protein, buttermilk solids, whole eggs, egg yolks, may be employed. Similarly, various gums such as the cellulose ethers, pectin, algins, gum arabic, gum tragacanth, and the like, may be employed. In conjunction with these materials, either alone or mixtures thereof, carbohydrates, such as flour, raw or gelatinized starches from various sources such as corn, tapioca, potato, sago, sorghum, rice, waxy maise, wheat, and the like, and sugars, such as sucrose, dextrose, corn syrup solids, lactose, and the like, may be employed.

These encapsulating materials may be employed in any suitable combination. It is preferred to employ, according to this invention, a mixture of non-fat milk solids and sucrose as the encapsulating solids where the dried emulsion is used as a cake shortening, although a neutral, dispersible form of casein, that is, sodium caseinate, is also preferred in view of the smaller quantity required relative to the skim milk solids.

Basic shortening fat constituents of these compositions may be any of those normally employed in the preparation of the particular food product to which the final composition will be directed. For example, in preparing these shortening compositions for use in cakes or other baked goods, the usual shortenings such as lard, modified lard, cottonseed, coconut, peanut and corn oil, which have been hardened by hydrogenation; butter, oleomargarine, or any combination of oils, semi-solid or solid fats, may be employed. These materials may have the melting point range, saponification value, iodine number, and other characteristics found to be desirable in the preparation of the particular baked goods desired.

In the preparation of the powdered fat compositions of this invention, the usual processes of the prior art are generally employed. The fatty constituents are melted and emulsified in a warm solution of skim milk solids and sugar by simple stirring. The mixture is then further emulsified by a suitable homogenizer and the emulsion is dried, as by roller-drying, spray-drying, and the like, preferably by spray-drying.

It has been found desirable where milk solids are employed to limit the amount of heat which is applied to the composition after the milk solids have been added. The preferred procedure, therefore, requires that the fatty materials be heated to a temperature of approximately 160° F. and that the milk solids and sugar solution be heated to from 130–140° F. The fatty materials and milk solids are then immediately mixed and emulsified, the resulting temperature of the emulsion being roughly 150° F. This emulsion is then immediately cooled to approximately 100° F. prior to drying. The skim milk solids which are employed are preferably those from fresh skim milk, and drying temperatures during drying are preferably held to a minimum. Spray-drying, of course, permits the use of minimum temperatures during drying.

The compositions of this invention have been found to be useful in a variety of food products. As aforementioned, the ability of these compositions to release the fat component quickly and effectively has a particular advantage in the case of prepared culinary mixes, and more particularly, those directed to the preparation of a shortening cake. Not only do the powdered shortenings of this invention provide the expected benefit of incorporation with the other dry ingredients during manufacturing of the mix but also the quality of the final baked product is greatly improved. This improved quality apparently is brought about by the improved manner in which the shortening fat is released during batter preparation and also because of a more favorable fat distribution throughout the prepared batter.

Furthermore, a batter can be prepared from these improved cake mixes with much less difficulty and in a shorter time than any conventional mixes. For example, conventional cake mixes require the addition of liquid ingredients in at least two separate portions during batter preparation. Also, from 3–5 minutes of mixing by machine or from 5–8 minutes of strenuous beating by hand is required to fully develop the cake batter. On the other hand, the improved mixes of this invention are prepared, in the case of cakes for example, by initially adding the total amount of liquid ingredients to the dry mix, followed by from 1 to 1½ minutes of simple stirring by hand to provide a completely developed batter. This reduction in time and effort required to fully develop a cake batter provides a significant improvement over conventional mixes.

Following are specific examples of powdered fat compositions of this invention. Unless otherwise indicated the phrase "propylene glycol mono-stearate" in the specific examples refers to the ester of propylene glycol and triple pressed stearic acid described hereinabove. "Hydroxylated soy lecithin" refers to a soy phosphatide composed of 65 percent lecithin and 35 percent soy bean oil which has been partially hydroxylated at the double bonds of the fatty acid groups in the lecithin by means of hydrogen peroxide treatment with lactic acid, the hydroxylated lecithin having an iodine number of about 80.

EXAMPLE 1

| Ingredients | Parts by Weight |
|---|---|
| Hydrogenated cottonseed oil 30°C. congeal point | 36 |
| Propylene glycol mono-stearate | 13 |
| Hydroxylated soy lecithin | 1 |
| Sucrose | 25 |
| Non-fat milk solids | 25 |

In preparing a powdered fat from these ingredients, the hydrogenated cottonseed oil, propylene glycol monostearate and lecithin are melted together and mixed at a temperature of 160° F. At the same time, the sucrose and non-fat milk solids are dissolved in 100 parts by weight of water and heated to 140° F. The two mixtures are combined with simple mixing and homogenized in a Manton-Gaulin homogenizer at 500 lbs. per sq. in. (gauge). The emulsion after homogenization is cooled to below 100° F. and then fed directly to a spray-drier operating at an inlet temperature of 380°–390° F. and an outlet temperature of about 250° F.

The spray-drier is of a conventional design and comprises a cylindrical tower 10 feet in diameter and 30 feet in height. The drier is of the co-current type wherein warmed drying air is introduced at the top of the drier and removed at the bottom. The drier has a spray-drying nozzle, ST–48–27 described fully in "Industrial Spray Nozzles," published by Spraying Systems, Incorporated, 1953, Catalogue No. 24, pages 25–27. The nozzle is located in the center of the drier, approximately 2.5 feet from its top and adapted to direct the atomized solution downwardly in a conical spray pattern. An air sweeping device within the drier is preferably employed to maintain the drier walls free from the dried material.

The emulsion is fed to the nozzle at a pressure of approximately 500 pounds per square inch (gauge). The resulting particulate free flowing powder is preferably cooled immediately to 35° F. and thereafter stored at room temperature.

EXAMPLE 2

*Cake mixes*

| Ingredients | Percent by wt. White | Percent by wt. Yellow | Percent by wt. Devil's Food |
|---|---|---|---|
| Sucrose | 33.4 | 36.0 | 35.0 |
| Flour, Patent wheat | 36.5 | 35.0 | 31.0 |
| Sodium chloride | .7 | .7 | .7 |
| Sodium bicarbonate | .6 | .6 | 1.1 |
| Sodium acid pyrophosphate | 1.0 | 1.0 | .6 |
| Powdered fat composition of Example 1 | 26.0 | 26.0 | 26.0 |
| Cocoa | | | 5.4 |
| Dextrose | 2.0 | | |

In preparing the above cake mixes, the ingredients are thoroughly mixed together by any of the usual means employed in intimately mixing dry powders. In preparing a cake batter from these mixes, 20 oz. of the mix is added to one cup of water and eggs. In the case of the Yellow and Devil's Food mixes, two whole eggs are employed for each 20 oz. of mix, while in the White cakes only two egg whites are employed.

The development of batter here is extremely simple. After the mixed ingredients have been thoroughly wetted with the aqueous ingredients, which usually takes about 30 seconds, an additional one minute of simple stirring by hand with a spoon is sufficient to fully develop a cake batter. The mixing can also, of course, be carried out with the usual household mixer, batter development again requiring only approximately 1 minute.

The batter is then divided between two 8" layer cake tins and baked at 375° F. for 20–30 minutes. Where the batter is prepared by hand, the resulting layers have an extremely good volume ranging on the average from 1200 cc. in a White cake to 1300 cc. in the Yellow cake and 1350 cc. in the Devil's Food cake. The batters prepared by machine mixing result in cakes having a volume averaging 50 cc. greater. In general, this amounts to an increase of from 50 to 100 cc. in volume over cakes made from conventional mixes. Furthermore, these cakes are of an excepitonally high grade based on their shape, color, texture, grain and eating quality.

An additional important advantage of these mixes is found after storage of the mixes for several months. Where conventional mixes lump badly, with consequent increased difficulty in batter preparation, the mixes here described retain their free flowing characteristics over long periods of storage and remain as easy to prepare as they were originally.

EXAMPLE 3

Following are formulas of powdered fat compositions found particularly useful as shortening in cake mixes.

|  | A | B |
|---|---|---|
| Hydrogenated cottonseed oil 30° C. congeal point | 43.0 | 43.0 |
| Propylene glycol mono-stearate | 16.0 | 16.0 |
| Hydroxylated soy lecithin | 1.0 | 1.0 |
| Sucrose | 30.0 | 34.0 |
| Non-fat milk solids | 8.0 | |
| Sodium caseinate | 2.0 | 6.0 |

In these two examples, the milk solids have been replaced either partially or completely with sodium caseinate. The emulsions are prepared and dried as in Example 1 and the powdered fat product is employed as in Example 1.

EXAMPLE 4

A process for the preparation of a partial ester of propylene glycol and stearic acid is as follows: propylene glycol was reacted in the presence of stannous chloride, an esterification catalyst, with commercial grade purified stearic acid (Armour's Neo Fat 18) having about 94 percent stearic acid, 4 percent palmitic acid, and 2 percent oleic acid. The reactants were in the following proportions:

| Reagents | Grams | Moles on pure basis |
|---|---|---|
| "stearic acid" | 574.7 | 2. |
| propylene glycol | 624.4 | 8. |
| stannous chloride | 1.2 | 0.2% of the fat acids. |

The stearic acid was melted and the above reagents were charged into a flask to which was connected a "10" water-cooled condenser packed with glass beads to recover the water formed in the esterification process. Nitrogen gas was sparged throughout the reaction mixture during reaction. Diffusion of the nitrogen through the mixture was insured by introducing the gas through a sintered glass filter tube, the lower extremity of which was placed just above the bottom of the flask. The reaction mixture was heated to approximately 175° C. and held thereat for 5 to 6 hours until the unreacted fatty acid content in the reaction mixture was less than 5 percent. The esterification product under the aforementioned conditionss had in the order of 60-65 percent mono-ester. The product was then employed in the preparation of a dried emulsion in accordance with the procedure of Example 1 and the powdered fat was used successfully in accordance with the disclosure in Example 2.

EXAMPLE 5

An emulsion was prepared from the ingredients of Example 3 and had the same parts by weight except that the sodium caseinate and sucrose were dissolved in 400 parts by weight of water prior to mixing with the fat phase. The emulsion is fed to the pinch between a pair of steam heated 12" diameter rolls rotating in opposite direction at about 1 r.p.m. and having an equilibrium steam pressure of 1 to 5 p.s.i. (gauge). A film of material was eventually dried and removed from the drum by a pair of doctor blades located approximately 180° from the point at which the emulsion first contacted the drum. A blast of cool air is uniformly introduced to the plastic emulsion on each drum prior to the emulsion being scraped off the drum between the doctor blades. The product was removed from the drum between doctor blades in the form of a thin sheet which breaks up into a pulverulent powder-like composition. This composition is cooled in a manner described in Example 1 and is operable according to any of the uses described in the foregoing examples.

EXAMPLE 6

A powdered shortening composition was prepared by the process of Example 1 using sodium caseinate as the proteinaceous foam strengthening material of the aqueous phase. Hydroxylated soy lecithin was added as part of the dried emulsion in one case and was absent in the other. Part of the powder of each batch was cooled at about 35° F. for three days to temper and crystallize the fat phase of each of the compositions.

| Variables | A Percent by wt. Control | B Percent by wt. No Lecithin |
|---|---|---|
| Hydrogenated cottonseed oil (36° C. congeal point) | 49 | 49 |
| Propylene glycol mono-stearate (approximately 45% mono-esters) | 10 | 10 |
| Hydroxylated soy lecithin | 1 | |
| Sodium caseinate | 10 | 10 |
| Sucrose | 30 | 31 |

EXAMPLE 7

The tempered powdered fats of Example 6 were employed as shortenings in prepared cake mixes according to the following formula:

| Ingredients | Percent Parts by Weight |
|---|---|
| Sucrose | 41.79 |
| Flour patent wheat | 41.46 |
| Sodium chloride | 0.70 |
| Sodium bicarbonate | 0.57 |
| Calcium phosphate | 0.16 |
| Sodium acid pyrophosphate | 0.65 |
| Powdered fat composition of Example 6 | 11.67 |
| Dextrose | 2.00 |
| Non-fat skim milk solids | 1.00 |

The mixes were used to prepare cake in the manner of Example 2. In the above formula the powdered fat used was either sample A or sample B of Example 6. Cakes were successfully baked in each case using a simple mild hand stirring for approximately one minute (150 strokes), the cakes prepared from fat compositions of sample A having approximately the same volume and grade as that obtained in Example 2. The absence of lecithin, on the other hand, in sample B when used in the aforementioned cake mix formula results in a somewhat lower volume and grade.

It will be understood that while the present invention has been described in part by means of the specific examples, reference should be had to the appended claims for the definition of the scope of the invention. The phrase "dried emulsion" in the claims refers to the product obtained when a liquid emulsion of the fat phase in an aqueous solution of the hydrophilic encapsulating solids is dried by any of the aforementioned methods to a low moisture content, e.g., 0.5%-2.5%, although this percent moisture is disclosed for purposes of description and not by way of limitation. The term "emulsion" means the dispersion of the fat and the hydrophilic encapsulating solids created when the melted fatty constituents are agitated and preferably homogenized in the aqueous phase prior to drying; homogenization pressures in the order of 500 p.s.i. (gauge) have been found adequate, although even higher homogenization pressures ranging up to 2000 p.s.i. (gauge) may be practiced. The "partial ester of a glycol and a higher fatty acid" recited in the claims contemplates a class of compounds obtained by the esterification of one or more glycol groups and involving the production of essentially a mono-ester for each glycol group, although di-esters may also be formed in the process. Since fatty acids are available only as mixtures thereof, the reacted fatty acid will usually vary for each ester such that the expression "partial ester of a glycol and a higher fatty acid" also contemplates a mixture of such partial esters having different higher fatty acids; the preferred fatty acids employed are stearic and/or palmitic.

What is claimed is:

1. A culinary mix adapted to be reconstituted into a batter for baked goods comprising a powderous free flowing blend of a flour, a leavening agent, and a dried emulsion comprising an edible partial ester of a glycol and a higher fatty acid and a fat encapsulated by a matrix of edible hydrophilic solids selected from the group consisting of proteinaceous materials and mixtures of proteinaceous and carbohydrate materials.

2. A mix according to claim 1 wherein the glycol employed is propylene glycol.

3. A culinary mix adapted to be reconstituted into a batter for baked goods comprising a powderous free flowing blend of a flour, sugar, an acid-type leavening agent, and a dried emulsion comprising an edible partial ester of a glycol and a higher fatty acid, and a fat encapsulated by a matrix of edible hydrophilic solids selected from the group consisting of proteinaceous materials, and mixtures of proteinaceous and carbohydrate materials.

4. A culinary mix adapted to be reconstituted into a batter for baked goods comprising a powderous free flowing blend of a flour, sugar, and a dried emulsion comprising lecithin, and an edible partial ester of a glycol and higher fatty acid and a fat encapsulated by a matrix of edible hydrophilic solids selected from the group consisting of proteinaceous materials and mixtures of proteinaceous and carbohydrate materials.

5. A culinary mix according to claim 4 wherein the lecithin is partially hydroxylated.

6. A culinary mix adapted to be reconstituted into a batter for baked goods comprising a powderous free flowing blend of a flour, a leavening agent, and a dried emulsion comprising an edible partial ester of a glycol and higher fatty acid and a fat encapsulated by a matrix of edible hydrophilic solids selected from the group consisting of proteinaceous materials and mixtures of proteinaceous and carbohydrate materials, said dried emulsion having been cooled to crystallize the fat phase thereof.

7. A product according to claim 6 wherein the fat phase of the dried emulsion has been crystallized by cooling the product to below 55° F.

8. A culinary mix adapted to be reconstituted into a batter for baked goods comprising a powderous free flowing blend of a flour, sugar, a leavening agent, and a dried emulsion comprising hydroxylated lecithin, an edible partial ester of a glycol and a higher fatty acid, and a fat encapsulated by a matrix of edible hydrophilic solids consisting of a mixture of non-fat milk solids and sucrose.

9. A culinary mix according to claim 8 wherein the higher fatty acid is a mixture of 55% palmitic acid and 45% stearic acid.

10. A culinary mix according to claim 9 wherein the fat component of the dried emulsion is semi-solid at room temperature and has a congeal point of 36° C.

References Cited in the file of this patent

UNITED STATES PATENTS

| | | |
|---|---|---|
| 1,928,781 | Chapin | Oct. 3, 1933 |
| 2,024,356 | Harris | Dec. 17, 1935 |
| 2,035,899 | Kraft | Mar. 31, 1936 |
| 2,065,676 | Fechner | Dec. 26, 1936 |
| 2,132,687 | Harris | Oct. 11, 1938 |
| 2,223,558 | Epstein | Dec. 3, 1940 |
| 2,431,497 | North et al. | Nov. 25, 1947 |
| 2,431,498 | North et al. | Nov. 25, 1947 |
| 2,445,948 | Wittcoff | July 27, 1948 |
| 2,508,393 | Jaeger | May 23, 1950 |
| 2,611,704 | Jaeger | Sept. 23, 1952 |
| 2,619,422 | Diamond | Nov. 25, 1952 |